(12) United States Patent
Glickman et al.

(10) Patent No.: US 10,891,669 B2
(45) Date of Patent: Jan. 12, 2021

(54) VIRTUAL SALES ASSISTANT KIOSK

(71) Applicant: UVNV, Inc., Costa Mesa, CA (US)

(72) Inventors: David Glickman, Los Angeles, CA (US); Rizwan Kassim, Los Angeles, CA (US)

(73) Assignee: UVNV, Inc., Costa Mesa, CA (US)

( * ) Notice: Subject to any disclaimer, the term of this patent is extended or adjusted under 35 U.S.C. 154(b) by 0 days.

(21) Appl. No.: 16/718,962

(22) Filed: Dec. 18, 2019

(65) Prior Publication Data
US 2020/0202405 A1   Jun. 25, 2020

Related U.S. Application Data

(60) Provisional application No. 62/781,795, filed on Dec. 19, 2018.

(51) Int. Cl.
| | | |
|---|---|---|
| G06Q 30/00 | (2012.01) | |
| G06Q 30/06 | (2012.01) | |
| G06Q 30/02 | (2012.01) | |
| G06Q 20/20 | (2012.01) | |
| G06Q 20/18 | (2012.01) | |
| G06Q 10/06 | (2012.01) | |

(52) U.S. Cl.
CPC . *G06Q 30/0613* (2013.01); *G06Q 10/063112* (2013.01); *G06Q 20/18* (2013.01); *G06Q 20/202* (2013.01); *G06Q 20/203* (2013.01); *G06Q 20/204* (2013.01); *G06Q 20/206* (2013.01); *G06Q 30/0268* (2013.01)

(58) Field of Classification Search
CPC .................. G06Q 30/0613; G06Q 30/268
USPC .................................................. 705/14.66
See application file for complete search history.

(56) References Cited

U.S. PATENT DOCUMENTS

| | | | | |
|---|---|---|---|---|
| 7,051,036 | B2 * | 5/2006 | Rosnow | G06Q 10/06 707/723 |
| 8,265,613 | B2 * | 9/2012 | Brisebois | H04W 4/00 455/414.3 |
| 8,406,809 | B2 * | 3/2013 | Florek | G06Q 20/20 455/558 |
| 8,880,051 | B2 * | 11/2014 | Ghosh | H04W 4/023 455/418 |
| 9,558,507 | B2 * | 1/2017 | Zilkha | G06Q 30/0269 |
| 9,727,874 | B2 * | 8/2017 | Navaratnam | H04M 3/5125 |
| 2006/0208066 | A1 * | 9/2006 | Finn | H04H 60/63 235/380 |
| 2015/0100441 | A1 * | 4/2015 | Alarcon | G07F 9/023 705/16 |
| 2018/0082349 | A1 * | 3/2018 | Viera | H04W 4/029 |
| 2019/0179405 | A1 * | 6/2019 | Sun | G06Q 30/0643 |
| 2020/0092711 | A1 * | 3/2020 | Chen | H04B 1/3816 |

* cited by examiner

*Primary Examiner* — David J Stoltenberg
*Assistant Examiner* — Michael I Ezewoko
(74) *Attorney, Agent, or Firm* — Maine Cernota & Rardin

(57) ABSTRACT

A kiosk configured to provide live service and sales support with a wide variety of features targeting the rural market, specifically the rural cellular mobile device market.

34 Claims, 2 Drawing Sheets

VIRTUAL SALES ASSISTANT KIOSK

FIELD OF THE INVENTION

The invention relates to customer experience management, and more particularly, to customer interfaces that facilitate interactions between a customer or prospective customer and remotely-located customer service and/or sales representatives.

BACKGROUND OF THE INVENTION

Especially in the case of products sold with a corresponding service contract, such as cellular phones, physical retail locations, after-sales support centers, and customer service centers, which are often combined into one location, are crucial to managing a customer's experience with the product and associated services as well as with the brand generally. Such locations provide opportunities for companies to market their products and services to both current customers and prospective new customers without the distraction of competing products and services that may be encountered online or in a retail setting. Such locations can also be very important in attracting and retaining older customers, who may find it difficult to make purchases without assistance or using the internet. Even if prospective customers are willing and able to make purchases online, many prefer the immediacy, personal attention, and security of a relationship with a nearby vendor that is associated with making a purchase at a physical retail location. Suffice it to say that these physical locations, in many cases, are crucial to a business's ability to retain current clients and attract new ones.

Unfortunately, among other locations, it may not be cost-effective to have physical retail locations in rural areas, given the fixed costs of operating a location and the reduced opportunity for sales and after-sales support that such locations provide. For this reason, physical locations are primarily located in relatively population-dense areas. In such areas, it is feasible to have a number of fully-staffed locations that prospective customers may visit and make inquiries and that customers may visit for after-sales supports and upgrades.

Some businesses have attempted to overcome these challenges by having a number of rural locations that are staffed only a limited number of hours, even irregularly, or co-locating within an existing business. Others have decided not to offer products and/or services in rural areas. Neither solution is optimal, however, with the former still often resulting in a relatively high cost per customer, reducing or even eliminating profit margins, and the latter failing to monetize potential customers altogether.

This problem, while prevalent in rural areas, can also apply to urban areas, where the cost of placing physical locations in certain areas may also outweigh the expected benefit of having such an establishment in those locations and also where increased reliance on public transportation may make it difficult for customers and prospective customers to access even relatively nearby existing locations.

Furthermore, even in areas where a physical location may otherwise make sense, the inherent delay associated with constructing such a location or even renovating an existing structure to render it suitable for its new purpose can result in significant delays and a potential loss of business and/or the delayed acquisition of new customers.

What is needed, therefore, are devices and methods of rapidly providing unserved or underserved customers and prospective customers with convenient access to customer service, products and services, and any associated provisioning of those products and/or services with the immediate service and personal attention associated with a retail location, regardless of the suitability of that location for a traditional physical retail location, while maximizing the productivity of customer service personnel and minimizing costs.

SUMMARY OF THE INVENTION

One objective of the present disclosure is to provide devices that enable real-time customer service in unserved and underserved areas in which it would otherwise be difficult or impossible to place a traditional, physical retail location, in a cost-effective manner.

Another objective of the present disclosure is to provide provisioning and technical assistance services to customers located in unserved and underserved areas in which it would otherwise be difficult or impossible to place a traditional, physical retail location, in a cost-effective manner.

Still another objective of the present disclosure is to provide a retail experience to customers located in unserved and underserved areas in which it would otherwise be difficult or impossible to place a traditional, physical retail location, in a cost-effective manner.

Even still another objective of the present disclosure is to make products and services available to customers and prospective customers located in unserved and underserved areas in which it would otherwise be difficult or impossible to place a traditional, physical retail location, without the delay associated with transactions completed using the internet or with the construction of a physical retail location.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Disclosed herein are devices, systems, and methods associated with providing virtual sales assistance to customers and prospective customers, allowing for cost-effective interaction by companies therewith in areas that do not have the population density to justify a permanent, fully-staffed retail location, are too expensive to justify the cost of constructing such a retail location, or in areas where the delay and/or cost associated with the construction of a retail location or locations is desired to be minimized.

Figure 1:
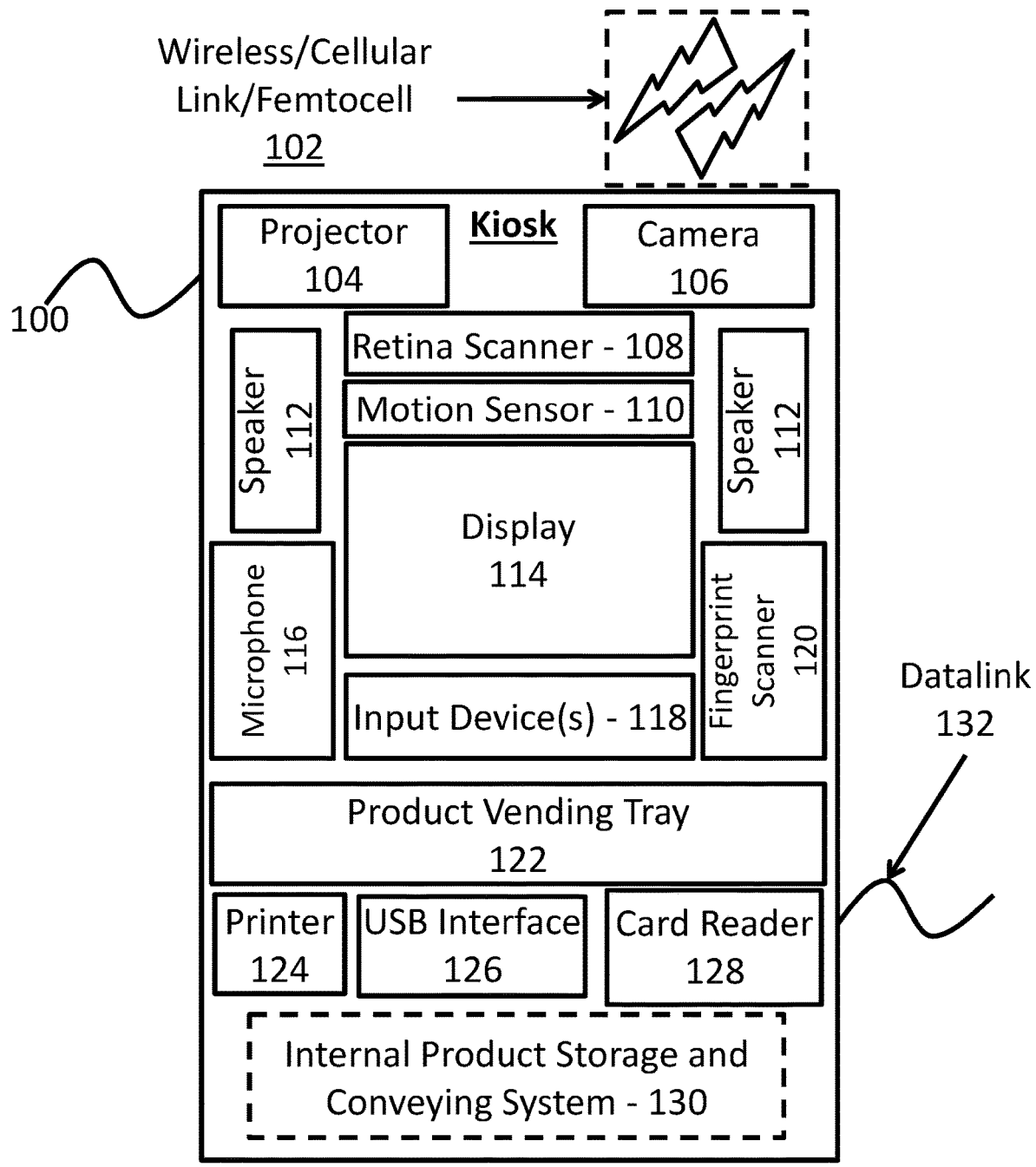
FIG. 1 is a schematic illustrating a data processing system configured in accordance with embodiments of the present invention.

With reference now to the figures, and in particular with reference to FIG. 1, there is depicted a data processing system 100, which may be an interactive kiosk 100 and is hereinafter referred to as such, without intending to limit the disclosure to a device of this particular form. In the embodiment shown in FIG. 1, the kiosk 100 includes at least one processor in operative communication with at least one non-transitory storage device, a display 114, a printer 124, a modem, a credit card reader 128, a data storage system, a camera 106, and a motion sensor 110.

In embodiments, a user may supply information to the kiosk 100 by utilizing an input device 118 to interact with information presented by the display 114, which, in embodiments, is itself an input device 118, e.g. a touch screen display 114, and/or other components of the kiosk 100. Those skilled in the art will recognize that, where the display 114 is a touch screen display 114, a user may use his or her finger or a stylus, which may be provided, as a pointing device, among other suitable options.

Information entered into the kiosk 100 may be utilized to create a document, such as a service contract, which may be provided to the user in a traditional hardcopy form printed on paper by a printer, or it may be kept as an electronic document stored, for example, in a data storage system or sent to the user by email.

The kiosk 100, in embodiments, is linked to a customer service system via a datalink 132, which may be a connection to the internet, so that the kiosk 100 may communicate with the customer service system, as known in the art. The datalink 132 may also provide a connection to further data processing systems, such as credit reporting bureaus, motor vehicle registries, rewards program databases, natural language processing services, and other resources, as may be required to facilitate expected transactions.

In addition, the kiosk 100 may interact with data processing systems to facilitate a transaction. For instance, various reports may be ordered through the datalink 132 from data processing systems, which may be third party data processing systems, including credit reports, verification of credit cards and bank accounts, and funds transfers. In embodiments, credit reports are limited to those not regulated by the Federal Deposit Insurance Corporation (FDIC), thereby, in some instances, avoiding enhanced regulation of the kiosk 100.

A user's interaction with the kiosk 100, in embodiments, begins with the user approaching the kiosk 100. In embodiments, the mere presence of the user within a pre-defined area surrounding the kiosk 100 triggers the kiosk 100 to use multimedia devices present thereon, which may include speakers 112, a display 114, a projector 104, and other devices, to either advertise goods and/or services to the user or to otherwise entice the user to approach and interact with the kiosk 100. In embodiments, the presence of the user within the pre-defined area surrounding the kiosk 100 is detected by a motion sensor 110 and triggers the kiosk 100 to initiate a connection to the customer service system, which may be staffed by a customer service representative, providing the customer service representative the opportunity to greet the user and invite them to utilize the kiosk 100. In embodiments, both the customer service representatives image, which may be in the form of a real-time video stream, and audio are reproduced at the kiosk 100. In embodiments, audio and video communication is two-way, allowing the user and the customer service representative to interact with one another.

In some embodiments, the projector 104 is capable of producing a hologram, which may be used to generate a holographic image of a live or pre-recorded customer service representative that may be used to entice the user to engage with the kiosk 100.

In some embodiments, the display 114 is a virtual reality or augmented reality device.

In additional embodiments, the kiosk 100 may be used to display and otherwise output advertising and promotional material to passerby.

In other embodiments, the user may approach the kiosk 100 and initiate an interaction therewith.

Upon interacting with the kiosk 100, the user may be presented with a variety of options. In embodiments, the user is presented with the opportunity to peruse and purchase products from a variety of sources, creating a virtual mall. In other embodiments, the user is presented with goods and services from only a single source, such as a provider of cellular telephone services.

In one exemplary embodiment, a user approaches the kiosk 100 and is greeted by a general live agent who then helps them get to the right stores/brand or, alternatively, the user may select the store or brand they would like to shop with or otherwise interact with the kiosk 100 using an input device 118 or input devices 118, which may include a touchscreen display 114, a mouse and keyboard, a gesture-based system, an augmented or virtual reality based system, a controller, a microphone 116 configured to receive voice commands, which may be natural language voice commands processed by the kiosk 100 or by a third party (e.g. Alexa, Siri, Google Home, etc.) through the datalink 132 or other network connection, any combination of such devices, or other suitable input device, as would be known to one of ordinary skill in the art. Once the user selects the store or brand they want to shop with, they are then connected with a customer service representative associated with and knowledgeable of that brand who can then assist them with placing orders through checkout for pick up or delivery or with other tasks.

Once a user is interacting with the kiosk 100, if the user is not already being assisted by a customer service representative, they may request the assistance of one using menu options, which, in embodiments, are selected in any of the ways provided for in the preceding paragraph. In other embodiments, a customer service representative's assistance is requested automatically upon the occurrence of a certain action or series of actions taken by the user, such as the user placing a relatively large number of items in a virtual shopping cart, exceeding a certain value of items in a shopping cart, typing in variations of a search term or phrase that might indicate they are having difficulty resolving a certain issue, and other situations that may indicate a need for assistance or a prospective client of particularly high importance (e.g. a VIP).

In embodiments, the customer service representative chosen to interact with the user is automatically selected based on their suitability to assist the user. For instance, if a user has entered search terms that trigger an automatic request for assistance, these search terms could be parsed using software and used to select a customer service representative with specialized knowledge regarding the query. In another example, a customer making a large number of purchases or who purchasing a high value item may be connected with a senior sale associate or rewards club member, who can then interact with the user to help ensure that transaction goes smoothly, thereby improving customer satisfaction and the completion of sales.

In embodiments, the customer service representative is allowed to take control over inputs to the kiosk 100, in embodiments with the permission of the user granted using the kiosk 100, allowing them to guide a user through a transaction.

In embodiments where the kiosk 100 is located inside of or near an existing retail establishment, customer service representatives of the retail establishment may be trained in providing customer service to kiosk 100 customers and may provide assistance thereto. Assistance may include retrieving an actual product, assisting the user with operating the kiosk 100, servicing the user's product, provisioning a product with services purchased through the kiosk 100, or other tasks that require services that the kiosk 100 cannot perform.

In other embodiments, the kiosk 100 may double as a vending machine for certain products, such as mobile phones and subscriber identity modules or SIM cards used to enable a phone to work on a particular cellular network. Such embodiments may also provide for programming of phones, SIM cards, embedded SIM cards (eSIM cards), and similar technologies through a card reader, USB, a wireless network, a cellular network, a femtocell, or other suitable interface. In embodiments, such products may be stored inside of the kiosk 100 and delivered to a customer through a product vending tray 122 using an internal product storage and conveying system 130.

In one exemplary embodiment, a subscriber to or prospective subscriber of a mobile phone service is walked through a video-supported activation process relating to mobile phone services which include, but are not limited to, prepaid, post-paid, temporary, and over-the-top (OTT) broadband Services, digital content subscriptions, such as Netflix®, Hulu®, Spotify®, Pandora®, HBO®, etc., and bundles thereof, by a customer service representative.

In embodiments, the data processing system 100 comprises a computer terminal, a virtual reality headset, an augmented reality display, a holographic display, or other device capable of enabling two-way interaction between a customer service representative and a customer or prospective customer.

In embodiments, all devices associated with the kiosk 100 are contained in a unitary housing.

In embodiments, the kiosk 100 includes an interface that allows a user to browse an app store and perform other, phone-related functions.

In embodiments, the kiosk 100 includes eye-tracking sensors that may be used to generate data that can be used for data analytics or other purposes.

In embodiments, the kiosk 100 is configured to perform data analytics based on a user's time in store and barcode scans and displays targeted ads to the user based on an analysis of that data.

In embodiments, the kiosk 100 is configured to direct a user to product available in a retail establishment in which the kiosk 100 is located. In further such embodiments, the kiosk 100 is configured to connect to a user's mobile electronic device and provide indoor directions therethrough.

In embodiments, the kiosk 100 is configured to integrate into an existing point-of-sale (POS) system, providing payment transfer and inventory tracking functionality.

In embodiments, the kiosk 100 comprises a built-in point-of-sale system, allowing it to transact payments and track inventory.

In embodiments, the kiosk 100 includes a built-in femtocell 102, or mini cell tower, allowing users to connect to a cellular network despite the absence of or poor local coverage.

In embodiments, the kiosk 100 may further comprise a projector 104, which, in embodiments, is capable of projecting a holographic image, which may be used to convey a 3 dimensional representation of a customer service representative to the user.

In embodiments, the kiosk 100 includes built-in inventory management sensors and may be configured to report low inventory to a designated organization or person tasked with replenishing the inventory.

In embodiments, the kiosk 100 is configured to provide data transfer services for users, for example allowing the purchaser of a new mobile device to transfer data from their old mobile device.

In embodiments, the kiosk 100 includes fingerprint 120, retinal 108, and/or other types of biometric scanners and/or is capable of identifying a user by voice, allowing secure identification of a user and the signing of binding documents thereby. In embodiments, user identification may also be used to allow a user to store preferences that change the user's experience with the kiosk 100. Stored preferences may be based on the user's previous engagement with the kiosk 100, or any associated kiosk 100, user-selectable options present on the kiosk 100 interface, preferences obtained from a user's mobile device, or other suitable indication of preferences or potential preferences.

In embodiments, other devices, such as a mouse or other pointing device and a data-entry device, such as a keyboard, are also included. Furthermore, those skilled in the art will appreciate that a number of other peripherals may also be provided, such as a CD-ROM reader and/or writer, USB interface(s) 126, a card reader and writer, etc.

In still further embodiments, kiosks 100 are located inside stores, which may be owned and/or operated by third party organizations. In some cases, kiosks 100 may be located outside of an existing establishment, allowing access thereto even outside of the normal operating hours of the establishment.

Figure 2:
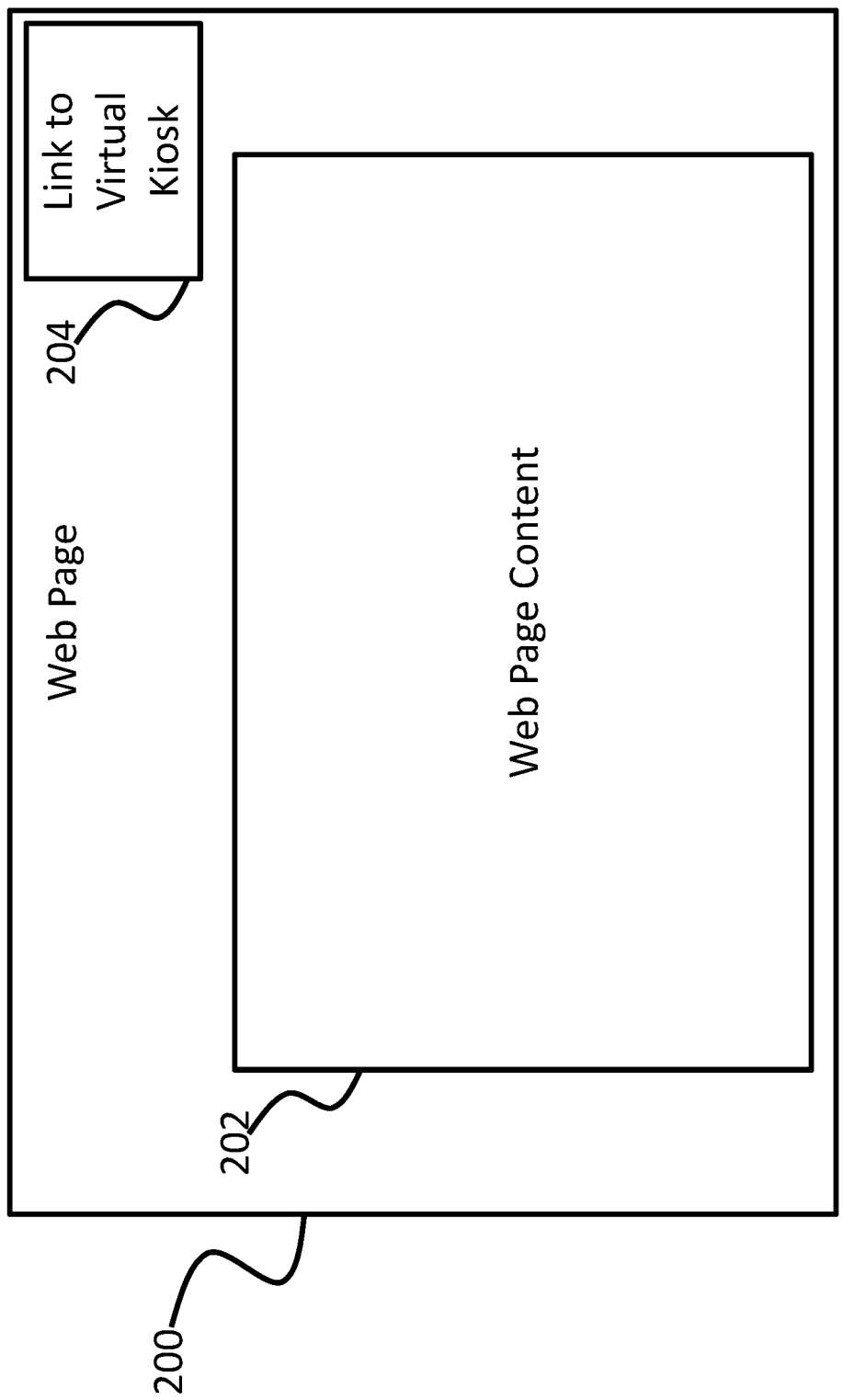
FIG. 2 is a schematic illustrating a virtual kiosk link on a website, in accordance with embodiments of the present invention.

In even further embodiments, such as that shown in FIG. 2, the kiosk 100 may be 'located' within a virtual store or retail portal, such as Amazon®, Simon Malls®, or Oath® shopping page or on aggregator sites or within apps such as Roku® or the Google® Play Store®. Where the kiosk 100 is located within a virtual store, retail portal or within an app or aggregator site, motion-sensitive features may rely on cursor or touch location proximity to a link 204 to the kiosk 100 functionality displayed on a web page 200 showing third party web page content 202. In other embodiments, controllers, virtual reality or augmented reality devices, and other suitable means may be used.

In embodiments, the kiosk 100 is used as a training tool, allowing customer service representatives to interact with trainers who may be remote from their present location.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Among our claims are:
1. A kiosk, the kiosk comprising:
   a freestanding structure configured for at least semi-permanent installation, the freestanding structure comprising:
   at least one processor in operative communication with at least one non-transitory storage device;
   at least one display in operative communication with said at least one processor;

at least one datalink in operative communication with said at least one processor, the at least one data link configured to connect the kiosk to at least one external resource;

at least one credit card reader in operative communication with said at least one processor, the at least one credit card reader being configured to process credit and/or debit card transactions;

at least one camera in operative communication with said at least one processor, the at least one camera being configured to capture images and/or video from a predetermined area;

at least one a motion sensor configured to detect motion within a second predetermined area in the vicinity of the freestanding structure;

at least one output device configured to convey visual and/or auditory messages and/or communications, to a user in the vicinity of the freestanding structure; and at least one input device configured to allow the user to control at least one aspect of the kiosk or to communicate therethrough, wherein the kiosk is configured, upon the detection of motion within the second predetermined area, to advertise goods and/or services to the user and/or to entice the user to approach and interact with the kiosk.

2. The kiosk of claim 1 wherein the at least one output device is selected from the group consisting of speakers, displays, and projectors.

3. The kiosk of claim 1 further comprising at least one femtocell, wherein the at least one femtocell is configured to provide internet access to users over a cellular network without requiring the users to initiate a connection to the femtocell.

4. The kiosk of claim 1 further comprising a printer, a modem, touchscreen display, a mouse and keyboard, a gesture-based system, an augmented or virtual reality based system, a controller, a microphone configured to receive voice commands, which may be natural language voice commands processed by the kiosk.

5. The kiosk of claim 1 wherein the display is a touch screen display.

6. The kiosk of claim 1 wherein the datalink is a connection to the internet.

7. The kiosk of claim 1 wherein the datalink provides a connection to systems selected from the group consisting of credit reporting bureaus, motor vehicle registries, rewards program databases, and natural language processing services.

8. The kiosk of claim 1 wherein the kiosk is linked to a customer service system via the datalink.

9. The kiosk of claim 8 wherein the detection of motion within the second predetermined area is configured to trigger the kiosk to initiate a connection to the customer service system.

10. The kiosk of claim 9 wherein the kiosk is further configured to facilitate two way communications between the user and a customer service representative after the kiosk connects to the customer service system.

11. The kiosk of claim 10 wherein the customer service representative's image is displayed to the customer after the kiosk connects to the customer service system.

12. The kiosk of claim 11 wherein the customer service representative's image is in the form of a real-time video stream and wherein the kiosk is further configured to broadcast the customer service representative's voice over the speakers and to transmit inputs captured by the input device from the kiosk to the customer service representative.

13. The kiosk of claim 11 wherein the at least one output device comprises a projector configured to display a projection to the user.

14. The kiosk of claim 13 wherein the projector is a holographic projector configured to display a holographic projection to the user.

15. The kiosk of claim 14 wherein the holographic projection presented to the user is a holographic representation of the customer service representative.

16. The kiosk of claim 10 wherein the customer service representative is a live agent.

17. The kiosk of claim 10 wherein the customer service representative is a computer simulation.

18. The kiosk of claim 1 wherein the kiosk is configured to allow the customer service representative to take control over the at least one input device.

19. The kiosk of claim 1 wherein the display is a virtual reality or augmented reality display.

20. The kiosk of claim 1 further comprising a USB interface and card reader configured to facilitate programming and activation of a cellular telephone and data transfer from a first cellular telephone to a second cellular telephone.

21. The kiosk of claim 1 wherein said display is configured to provide a plurality of product and/or service options provided by a plurality of sources to the user.

22. The kiosk of claim 1 wherein the kiosk is linked to a customer service system via the datalink, wherein the display is configured to present a variety of goods and/or services to the user for purchase, wherein the user's interaction with the display is configured to trigger the kiosk to initiate a connection to the customer service system, and wherein the kiosk is configured to facilitate two way communications between the user and a customer service representative after the kiosk connects to the customer service system.

23. The kiosk of claim 22 wherein the customer service representative chosen to interact with the user is automatically selected based on their suitability to assist the user.

24. The kiosk of claim 23 wherein the suitability of a particular customer service representative is determined based on search terms entered by the user, the user's selection for purchase of particular goods and/or services, and/or the overall cost of goods and/or services added to a virtual shopping cart.

25. The kiosk of claim 1 wherein said kiosk is configured to store products and to deliver those products to the user through a product vending tray using an internal product storage and conveying system.

26. The kiosk of claim 1 wherein said kiosk is configured to direct the user to the location of a selected product available in a retail establishment in which the kiosk is located.

27. The kiosk of claim 26 wherein said kiosk is configured to connect to a user's mobile electronic device and provide directions to the user using said mobile electronic device.

28. The kiosk of claim 1 wherein said kiosk is configured to integrate into an existing point-of-sale system.

29. The kiosk of claim 1 wherein said kiosk further comprises a point-of-sale system configured to allow the kiosk to transact payments and track inventory.

30. The kiosk of claim 29 wherein the kiosk further comprises inventory management sensors and is configured to report low inventory to a designated organization or individual.

31. The kiosk of claim 1 further comprising at least one biometric authentication system configured to allow the user's identity to be verified.

32. The kiosk of claim 31 wherein the at least one biometric authentication system is selected from the group consisting of fingerprint scanners, retinal scanners, voice identification systems, facial recognition systems, and typing cadence identification systems.

33. The kiosk of claim 1 wherein said kiosk is configured to allow the user to store preferences that change aspects of the user's experience with the kiosk.

34. The kiosk of claim 1 wherein the kiosk is a virtual kiosk that is a clickable portion of a website and wherein motion detection functions of the kiosk detect cursor motion and/or the user's point of focus on the web site.

* * * * *